United States Patent
Takano et al.

(10) Patent No.: US 6,212,880 B1
(45) Date of Patent: Apr. 10, 2001

(54) ENGINE CONTROL DEVICE

(75) Inventors: Yoshiya Takano; Takeshi Atago, both of Hitachinaka; Seiji Suda, Mito; Yuichi Kitahara, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/269,073

(22) PCT Filed: Sep. 20, 1996

(86) PCT No.: PCT/JP96/02717

§ 371 Date: Mar. 19, 1999

§ 102(e) Date: Mar. 19, 1999

(87) PCT Pub. No.: WO98/12423

PCT Pub. Date: Mar. 26, 1998

(51) Int. Cl.[7] .................................................. F01N 3/00
(52) U.S. Cl. .................. 60/274; 60/277; 60/285; 60/295; 60/301; 123/676; 123/682
(58) Field of Search .............. 60/274, 277, 285, 60/295, 301; 123/676, 682

(56) References Cited

U.S. PATENT DOCUMENTS

| | | | |
|---|---|---|---|
| 5,347,974 | * | 9/1994 | Togai et al. ............................ 123/682 |
| 5,412,946 | * | 5/1995 | Oshima et al. ......................... 60/286 |
| 5,544,639 | * | 8/1996 | Shouda et al. ......................... 123/676 |
| 5,595,060 | * | 1/1997 | Togai et al. ............................ 60/274 |
| 5,775,099 | * | 7/1998 | Ito et al. ................................. 60/274 |
| 6,041,591 | * | 3/2000 | Kaneko et al. ......................... 60/274 |

FOREIGN PATENT DOCUMENTS

| | | |
|---|---|---|
| 4-241753 | 8/1992 | (JP) . |
| 5-133260 | 5/1993 | (JP) . |

* cited by examiner

Primary Examiner—Thomas Denion
Assistant Examiner—Thai-Ba Trieu
(74) Attorney, Agent, or Firm—Evenson, McKeown, Edwards & Lenahan, P.L.L.C.

(57) ABSTRACT

An engine control device provided with a lean NOx catalyst comprises means for estimating a condition of the lean NOx catalyst, means for performing reactivation control of the lean NOx catalyst based on the result, and means for controlling the termination of the reactivation control. The lean NOx catalyst is constantly made usable in a favorable condition.

37 Claims, 15 Drawing Sheets

NORMAL CONTROL (1)

NORMAL CONTROL (1) + REACTIVATION CONTROL

FIG. 7

NORMAL CONTROL (2)

| 1cyl | EXH | INT | COMP | COMB | EXH |
|---|---|---|---|---|---|
| 3cyl | COMB | EXH | INT | COMP | COMB |
| 4cyl | COMP | COMB | EXH | INT | COMP |
| 2cyl | INT | COMP | COMB | EXH | INT |

FIG. 8

NORMAL CONTROL (1) + REACTIVATION CONTROL

| 1cyl | EXH | INT | COMP | COMB | EXH |
|---|---|---|---|---|---|
| 3cyl | COMB | EXH | INT | COMP | COMB |
| 4cyl | COMP | COMB | EXH | INT | COMP |
| 2cyl | INT | COMP | COMB | EXH | INT |

FIG. 13
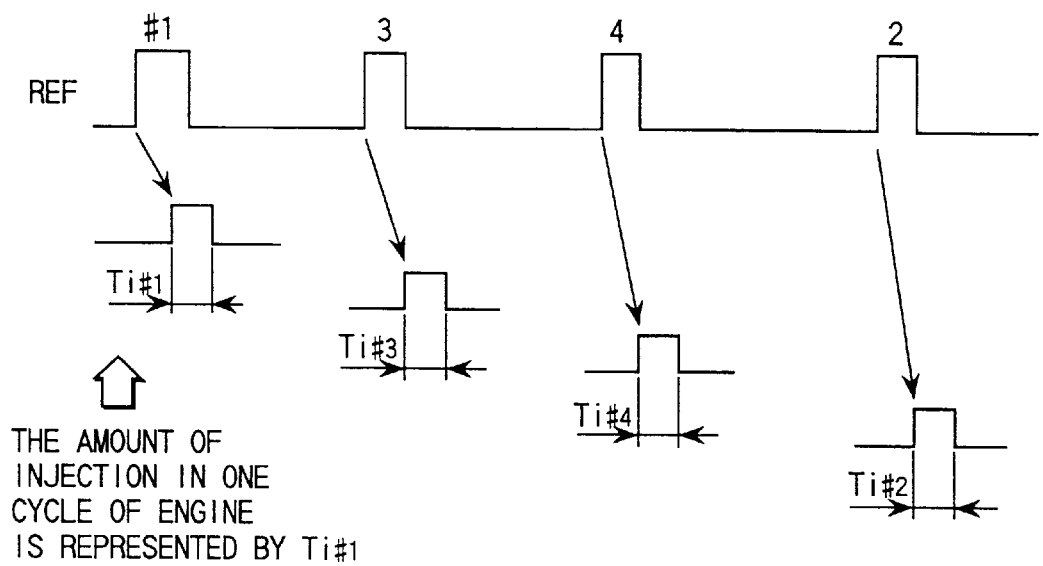
THE AMOUNT OF INJECTION IN ONE CYCLE OF ENGINE IS REPRESENTED BY Ti#1
FIG. 14
$$Qf = k \times Ti\#n \quad (n=1,2,3,4)$$
FIG. 15
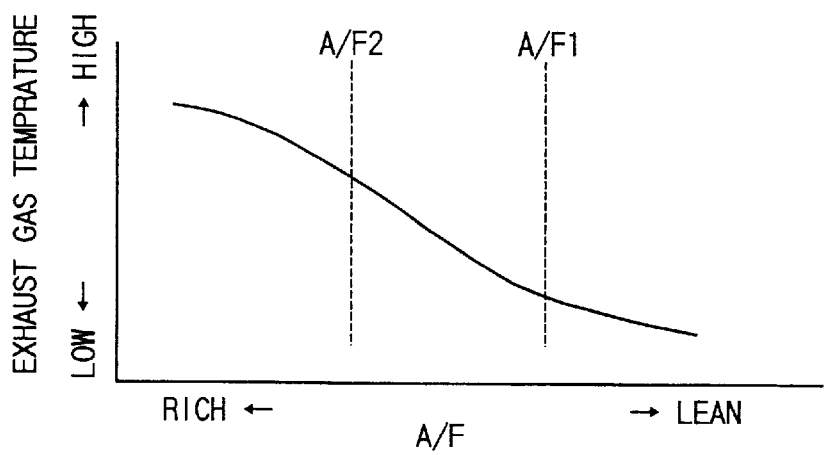

BREADTH OF INJECTION PULSES DURING EXHAUST STROKE

WEIGHTING FACTOR

ENGINE CONTROL DEVICE

TECHNICAL FIELD

The present invention relates to an engine control system for cleaning exhaust gas exhausted from lean-burn combustion engines, particularly, for suppressing release of NOx, and to an engine control device for achieving always stable clean up of the exhaust gas by controlling reactivation of catalyst based on an estimation of deterioration of the catalyst performance.

BACKGROUND OF THE TECHNOLOGY

Regarding an improvement on clean-up rates of lean NOx catalyst, JP-A-5-133260 (1993), for instance, discloses a method for improving transient clean-up rates by changing a target air-to-fuel ratio from a rich condition to a lean condition and its reverse alternately. However, the above prior art does not teach nor suggest any reactivation (recovery) control of the clean-up rates to SOx poisoning based on time-elapsing effects of NOx catalyst by heating utilizing so-called after-burn efficiencies and the like.

Regarding conventional in-cylinder-injection engines, a prior art is described, for instance, in JP-A-4-241753 (1992). The technology is to make a fuel distribution homogeneous by controlling fuel injection timing based on a temperature of cooling water of the engine, in order to achieve stable stratified combustion in a lean condition of the in-cylinder-injection engine.

However, any special countermeasures for the exhaust gas of the stratified combustion, wherein the combustion is performed in a lean condition far from the stoichiometric air-to-fuel ratio, has not been considered. Regarding release of NOx, which is a particular problem of the lean combustion, no processing nor controlling has been considered.

DISCLOSURE OF THE INVENTION

In accordance with the lean-burn engine, particularly lean combustion (stratified combustion) in the in-cylinder-injection engine, the combustion is performed by forming a combustible mixture locally in the vicinity of plugs in a remarkably lean condition as a whole cylinder.

Accordingly, its exhaust gas can not be cleaned on all the components to be removed by conventional three way catalyst, particularly, a lean NOx catalyst becomes necessary for nitrogen oxides (NOx).

Regarding the NOx catalyst, an important point is how to maintain its performance. In particular, a countermeasure for gasoline containing sulfur components (S) more than conventional gasoline becomes necessary in accordance with deregulation on gasoline and the like.

Even on the conventional gasoline, a decrease of the clean-up rate by sulfur can be generated based on transient effects, and it is regarded as a SOx poisoning.

The SOx poisoning is caused by S components in gasoline, and depending on how much the catalyst itself is exposed to the exhaust gas atmosphere.

FIG. 3 indicates a change of characteristics of the lean NOx catalyst in accordance with elapsing time, which is indicated on the abscissa. In accordance with the characteristics, it is revealed that the change is proportional to the time exposed to the exhaust gas atmosphere, in other words, proportional to a total mount of gasoline containing S supplied to the engine.

Furthermore, in accordance with the mechanism, the S component in gasoline is changed to SOx (sulfur compounds) by combustion, released as a part of the exhaust gas, and formed a compound with an active component for NOx clean-up in the lean NOx catalyst at surface of the catalyst, as shown in FIG. 4. Due to the above phenomenon, the function of the active component for NOx clean-up in the catalyst is decreased, and the catalyst performance is deteriorated.

On the other hand, it has been known that the clean-up performance of the catalyst can be recovered by making its atmosphere at a designated temperature as indicated by dotted lines in FIG. 3. In the above case, the higher the temperature in the atmosphere of reactivation control shown by an arrow is, the higher the degree of the recovery is.

The mechanism of recovery is to make the active component of the catalyst functional as it conventionally is by heating the catalyst (for instance, at least 500–600° C.) for separating SOx from the active components of the catalyst.

The problem to be solved by the present invention is to provide an engine control device provided with lean NOx catalyst, which is usable of the lean NOx catalyst having the above characteristics in a preferable condition at all the time, and to provide an engine control device provided with the lean NOx catalyst, which can practically perform the reactivation control indicated by the arrow in FIG. 3 when the clean-up rate is decreased by sulfur and the like based on change of the lean NOx catalyst with elapsing time.

The engine control device provided with the lean NOx catalyst relating to the present invention solves the above problems by the following measures.

First, the engine control device of the present invention comprises a condition estimating means and a reactivation controlling means for catalyst itself.

The condition estimating means for catalyst has practically a following composition. A deteriorated condition of the catalyst depends on the elapsing time exposed to the exhaust gas, and the degree of deterioration depends on the amount of fuel used for the combustion. This is clear from the previously described mechanism of deterioration by S components contained in the fuel. Accordingly, the degree of deterioration is estimated from the total supplied amount of the fuel and the elapsing time of the catalyst exposed to the exhaust gas containing the S components. Furthermore, the degree of deterioration of the catalyst can be determined by any of the temperature of the catalyst itself, $O_2$ sensors arranged at upstream and downstream of the catalyst, and various exhaust gas sensors such as air-to-fuel ratio sensors and the like.

Next, the reactivation control at a high temperature can be achieved by elevating the exhaust gas temperature forcibly in view of the fact that the engine is operated routinely in a lean condition and the exhaust gas temperature is lower than that in a conventional condition of stoichiometric air-to-fuel ratio.

Practically, the exhaust gas temperature is elevated by an ignition timing retardation control. Regarding the in-cylinder-injection engine, the exhaust gas temperature can be elevated with an after-burn effect by performing fuel injection during an exhaust stroke. In accordance with the control, the exhaust gas temperature can be elevated forcibly to higher than a routine operation condition, and the reactivation control indicated in FIG. 3 becomes possible. It is clear that the ignition timing retardation control is applicable to conventional lean combustion of a MPI system, and that the reactivation control is effective for achieving a heating effect for the catalyst atmosphere, because fuel combustion becomes possible without using a control such as a special ignition control and the like by injecting fuel into an atmosphere at a relatively high temperature during exhaust valves are in an opening condition during an exhaust stroke injection of the in-cylinder-injection engine.

Controlling time for the reactivation control is more effective with a shortened time at a higher temperature as the dotted line in FIG. 3 indicates. Accordingly, the controlling time of the reactivation control is regulated based on an estimated exhaust gas temperature in that condition. The degree of the heating effect in the reactivation control is the largest at the first cycle, and is in a tendency to decrease after second cycle with the same heating time. Therefore, in order to realize the reactivation control more effective, it is effective to change the length of the controlling time in consideration of the controlling cycles such as extending the controlling time after second cycle longer than the controlling time of the first cycle.

When the reactivation control becomes necessary in a stratified combustion condition of a lean condition, the reactivation control is performed by replacing a fundamental combustion condition of the engine with an air-to-fuel ratio condition. In accordance with the replacement, the reactivation control is performed in a condition that the basic exhaust gas temperature is elevated by injecting at an exhaust stroke and retarding the ignition timing in order to improve its effects, and concurrently, the basic temperature during the reactivation control can be made clear by selecting the stoichiometric air-to-fuel combustion condition as the standard condition of the exhaust gas temperature. Instead of the estimated exhaust gas temperature, the exhaust gas temperature determined by temperature sensors arranged in the lean NOx catalyst or the exhaust gas system including the lean NOx catalyst can be used.

FIG. 2 indicates a fundamental portion of the present invention. A SOx poisoning amount of the catalyst is estimated based on Qa, i.e. an amount of air flow intake into the engine, or Ti, i.e. a pulse width for controlling the amount of injection supplied into the engine. Simultaneously, initiation or shut-off of the exhaust gas injection is judged based on the exhaust gas temperature, and the reactivation control is performed with monitoring the exhaust gas temperature by fuel and ignition control.

During the reactivation control, the exhaust gas system damage (thermal deterioration by a high temperature) including the lean NOx catalyst by a careless control must be avoided, because the exhaust gas temperature is increased forcibly.

The heating condition for recovering the functions of the active component of the catalyst requires at least 500° C. as described previously. However, the active component of the catalyst has a possibility to cause a thermal deterioration if the heating temperature exceeds approximately 900° C. Therefore, the reactivation control must be performed so that the lean NOx catalyst temperature, or the exhaust gas temperature at the upstream entrance portion of the lean NOx catalyst must be kept lower than 900° C.

If an overshoot, wherein the transient temperature exceeds 900° C. in a course of stabilizing the reactivation control, and the like are generated, an unit continuous control time of the reactivating over 900° C. is desirably shorter than tens to 30 seconds. If a case when the unit time exceeds tens to 30 seconds, the reactivation control must be stopped, or interrupted temporarily, and the reactivation control is desirably resumed at a temperature below 900° C.

BRIEF DESCRIPTION OF THE DRAWINGS

FIG. 7 is an illustration indicating an injecting condition, wherein stratified combustion is applied to the in-cylinder-injection, FIG. 8 is an illustration indicating an injecting condition, wherein the normal and exhaust stroke injections are performed from the condition shown in FIG. 7, FIG. 13 is an illustration indicating an injecting condition, FIG. 14 is another embodiment of the step ① shown in FIG. 12, FIG. 15 is a graph indicating a relationship between air-to-fuel ratio and exhaust gas temperature.

PREFERRED EMBODIMENT OF THE INVENTION

Figure 1:
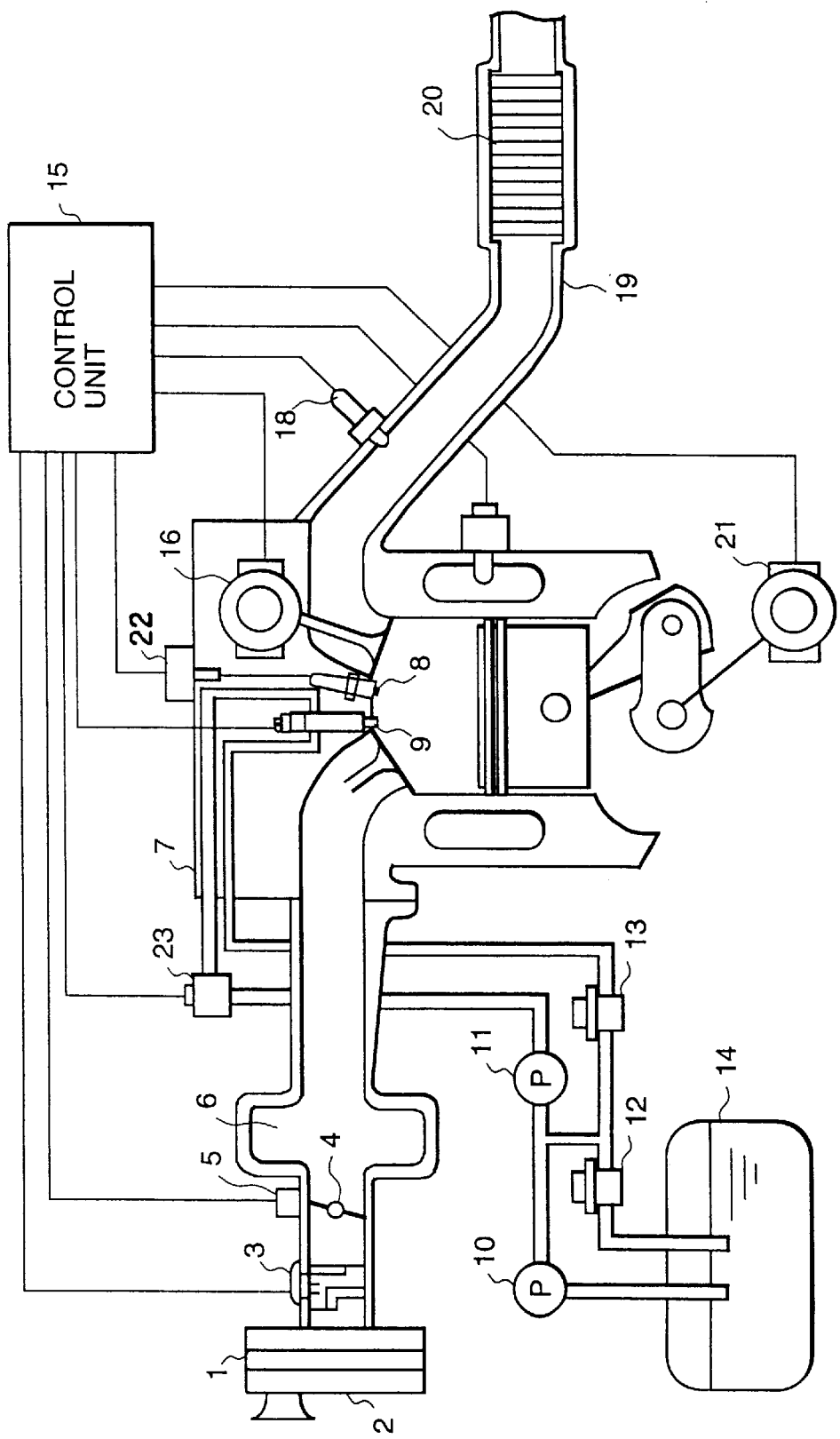
FIG. 1 is a schematic illustration indicating an example of in-cylinder-injection engine system, whereto the present invention can be applied.
Figure 2:
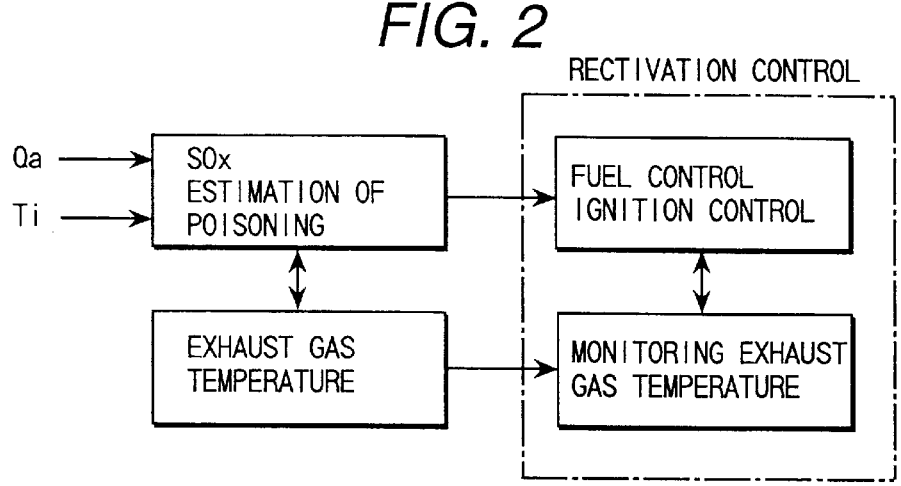
FIG. 2 is an illustration indicating a composition of the primary portion of the present invention.

Hereinafter, embodiments of the engine control device provided with the lean NOx catalyst of the present invention are explained in details referring to the drawings.

FIG. 1 is a schematic illustration indicating an example of engine system, whereto the present invention can be applied. In FIG. 1, intake air to the engine is taken from an entrance portion 2 of an air cleaner 1, flows through an air flow meter 3 and a throttle body, which contains a throttle valve 5 to control an amount of the intake air, and enters into a collector 6.

Then, the intake air is distributed to each of intake pipes connected to each cylinders of the engine 7, and introduced into the cylinders.

On the other hand, fuel such as gasoline and the like are supplied from a fuel tank 14 to a fuel system, whereto an injector is connected with a pipe, by pressurizing preliminary with a fuel pump 10, and secondarily with a fuel pump 11. The pressure of the preliminary pressurized fuel is controlled to be a designated pressure (for instance, 3 kg/cm$^2$) by a fuel pressure regulator 12, and the pressure of the secondarily pressurized fuel, which is higher than the pressure of the preliminary pressurized fuel, is controlled to be a designated pressure (for instance, 30 kg/cm$^2$) by a fuel pressure regulator 13, and the fuel is injected into the cylinder from the injector 9 provided to each of the cylinders. Here, the fuel pressure regulator 13 can be any type of regulating mechanically at a designated pressure, and of regulating the controlling pressure linearly in accordance with electrical signals from outside the system, and the types of the regulator do not restrict the present invention.

The pressure of the secondarily pressurized fuel is detected by a fuel pressure sensor 23, and the output from the sensor is input into a control unit 15.

Signals indicating the amount of the intake air is output from the air flow meter 3, and is input into the control unit 15.

A throttle sensor 4 for detecting the opening of the throttle valve 5 is provided to the throttle body, and its output is also input into the control unit 15.

A crank angle sensor 16 is provided to an axle of cam shaft, and a reference angle signal REF indicating a rotation position of the crank axle and an angular signal POS for detecting rotation signal (number of rotations) are output. These signals are also input into the control unit 15. The crank angle sensor can be of a type which detects the rotation of the crank axle directly as indicated as 21.

In order to ignite an air-fuel mixture in the cylinder, electric power is supplied to a coil 22 from the control unit 15, and when supplying the power is interrupted, a high voltage is charged to an ignition plug 8 and an ignition energy is supplied to the air-fuel mixture.

A pressure-in-cylinder sensor detects the pressure in the cylinder, converts the pressure in electric signals, and transmits the signals in the control unit 15.

An A/F sensor 18 is provided at the exhaust gas pipe, and its output signals are also input in the control unit 15. Furthermore, a lean NOx catalyst is provided at the exhaust gas pipe 19, and hazardous components in the exhaust gas are removed.

Main part of the control unit 15, although not shown in the drawing, is composed of MPU, ROM, RAM, and I/O including A/D converter, LSI, and the like. The control unit 15 takes in signals from various sensors detecting the operation condition of the engine as input, performs various calculating processes, outputs various control signals which are obtained as the results of the above calculation, supplies designated control signals to the injector 9 and the ignition coils 22, and executes fuel supplying amount control and ignition timing control.

Figure 5:
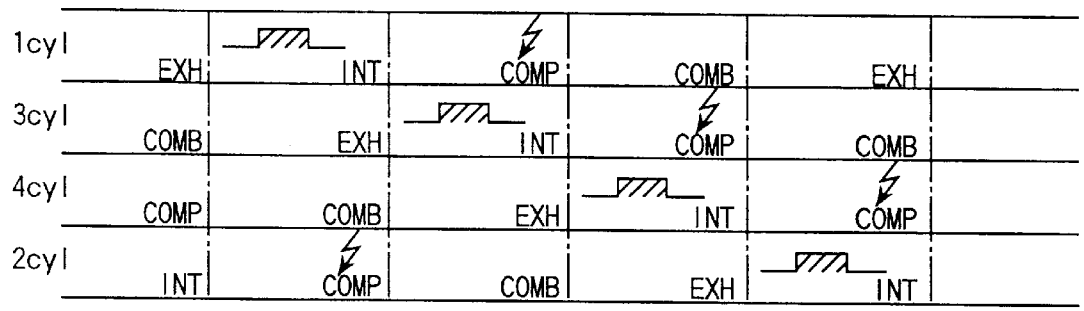
FIG. 5 is an illustration indicating a normal injecting condition of in-cylinder-injection.

In accordance with the in-cylinder-injection engine as described above, fuel supply to the engine varies depending on the operation condition. In a case when fuel is injected in an intake stroke and ignited in a following compression stroke as indicated in FIG. 5, that is, combustion is performed in the stoichiometric air-to-fuel condition (homogeneous combustion) and in a lean condition such as air-to-fuel ratio as of 20~30. On the other hand, FIG. 7 indicates the fuel injection in the stratified combustion, and a lean combustion such as the air-to-fuel ratio of 30~40 is performed.

Figure 6:
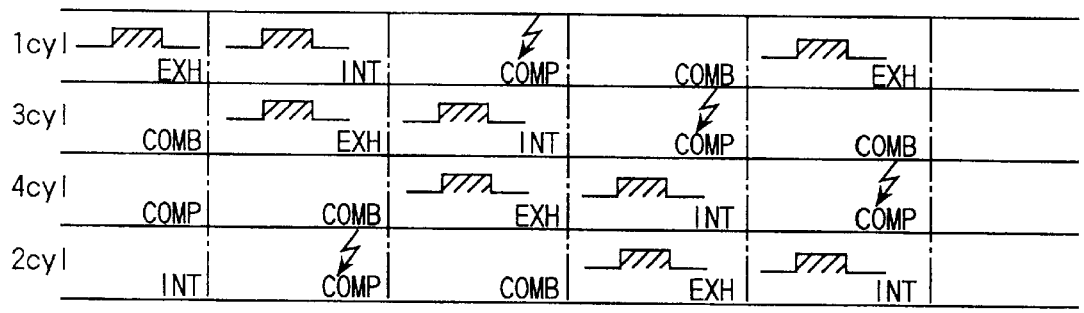
FIG. 6 is an illustration indicating an injecting condition, wherein exhaust stroke injections are added to the condition shown in FIG. 5.

Fuel supplying conditions at the reactivation control of the present invention are indicated in FIG. 6 and FIG. 8, respectively.

The control condition indicated in FIG. 5 is explained as a normal control (1) under a stoichiometric air-to-fuel ratio combustion condition.

When reactivation control becomes necessary in a condition indicated in FIG. 5, fuel is injected in an exhaust stroke of each of the cylinders concurrently with the normal control (1).

FIG. 7 indicates a condition, wherein a condition of the stratified combustion is taken as a normal control (2). When reactivation control becomes necessary in a condition indicated in FIG. 7, fuel supply relating to engine power is performed by the normal control (1), and the same control as FIG. 7 is performed in FIG. 8.

When exhaust stroke injection is performed with in-cylinder-injection, fuel is injected to an exhaust gas in a condition at a high temperature soon after burnt in the combustion chamber, and injected fuel is burnt in the route from the combustion chamber to the lean NOx catalyst 20. Therefore, a high temperature condition higher than the exhaust gas temperature generated by the normal control (1) can be generated.

Figure 9:
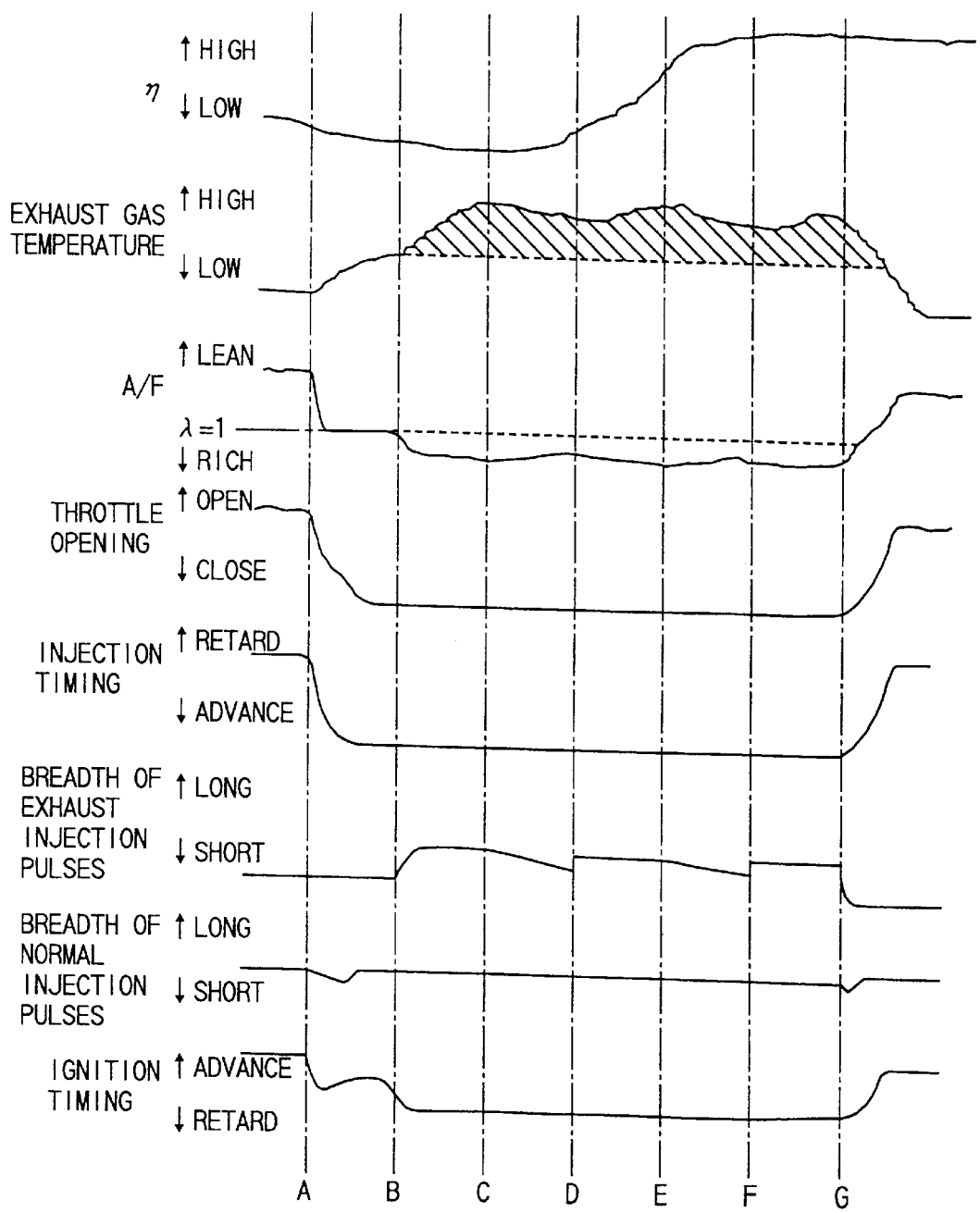
FIG. 9 is an illustration for explaining conditions of the reactivation control process.

FIG. 9 indicates various control parameters and changes in conditions accompanied with operation. The abscissa indicates elapsing time. At the point A, the estimated result of the condition of the lean catalyst becomes to necessitate the reactivation control. Details of the reactivation control will be described later. At this time, the engine is in a stratified combustion condition, and transferring to a homogeneous combustion condition, that is a base condition of the reactivation control, is performed as a transfer from the point A to the point B. The air-to-fuel ratio in the stratified condition is a lean condition, and the operating condition is in a condition wherein the exhaust gas is being cleaning by the lean NOx catalyst 20. When the reactivation control becomes necessary at the point A, the homogeneous combustion at the point B is made possible by operating target air-to-fuel ratio, throttle opening, fuel injection timing, and ignition timing. The exhaust gas temperature at this time is elevated in accordance with transferring from the air excess condition of the stratified condition to the homogeneous combustion. The exhaust gas temperature is elevated by performing fuel injection in the exhaust stroke, which is the reactivation control of the present invention, after forming this condition, and retardation control of the ignition timing. Then, the reactivation control is performed. The diagonally shaded area of the exhaust gas temperature in FIG. 9 indicates the exhaust gas temperature rise based on the effect of the reactivation control.

Regarding the change of cleaning ratio of the lean NOx catalyst 20, the cleaning ratio is recovered gradually by making the atmosphere in a high temperature condition, and the control is finished at the point G.

Figure 10:
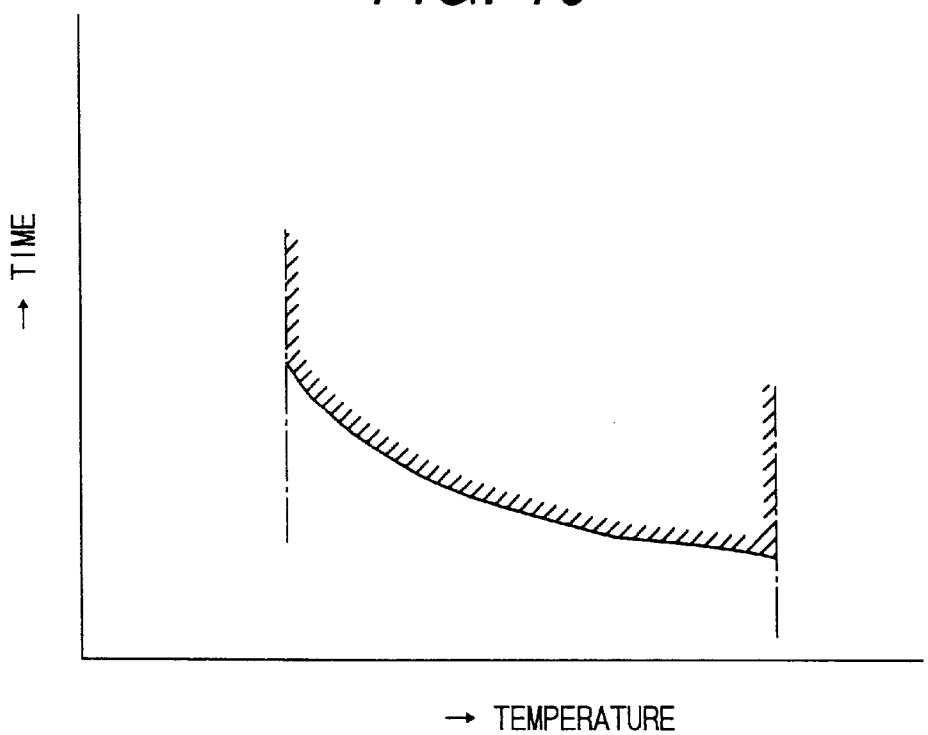
FIG. 10 is a graph indicating a region of the reactivating condition, FIG. 11 a graph indicating a characteristics of exhaust gas temperature of engine.
Figure 11:
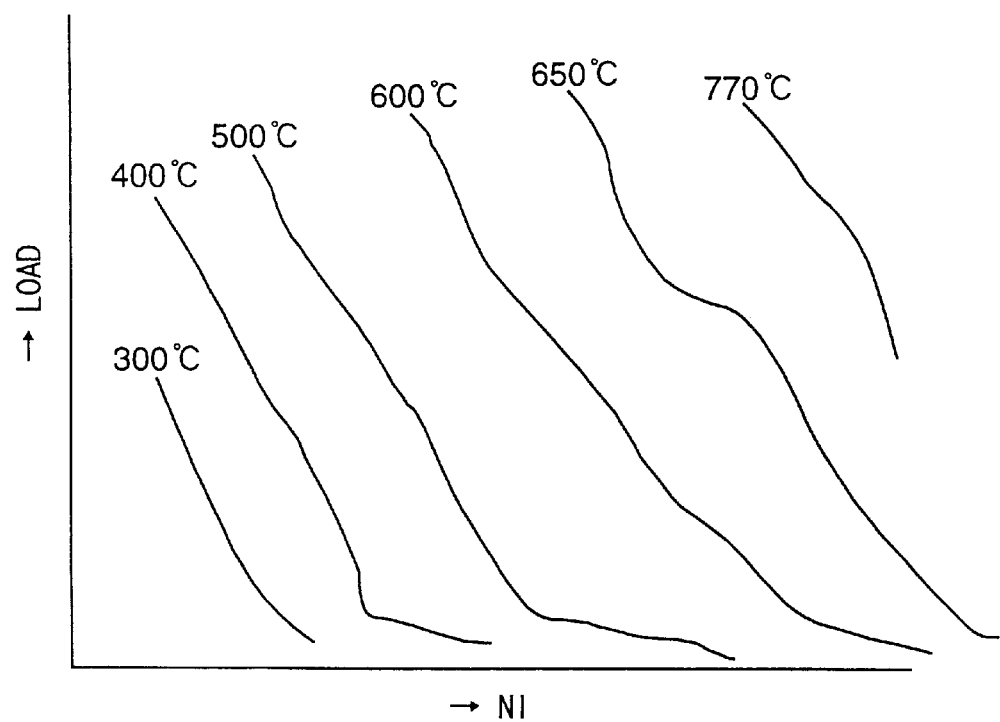

The control time from the point B to the point G is explained referring to FIG. 10 and FIG. 11.

That is, there is a range in the recovery of cleaning ratio by the reactivation and the reactivation control, and a controllable range is indicated by the diagonally shaded area in FIG. 10. At the low temperature side, the atmosphere temperature is low such as in a temperature range lower than the temperature, whereat SOx and the active components of the catalyst is separable. At the high temperature side, a restriction not to allow the execution of the reactivation control by the injection at the exhaust stroke and retarding the ignition timing, or to interrupt the reactivation control immediately and the like, is required in a case, when the heat resistance of the catalyst causes a problem, that is, when the catalyst temperature exceeds 1000~1100° C. However, if the heat resistance is ensured, the restriction at the high temperature side becomes unnecessary.

The effects of the reactivation control varies depending on the temperature of the exhaust gas at the moment. Accordingly, the control unit 15 has a temperature map such as shown in FIG. 15 inside, and an upper limit control, furthermore, the reactivation control time can be managed by knowing the condition executing the reactivation control at the moment and the estimated exhaust gas temperature (a relationship between number of rotations of the engine and engine load).

The above explanation describes all the operation and effects of the engine control device provided with the lean NOx catalyst, whereto the present invention is applied. Hereinafter, details of the reactivation control is explained referring to figures after FIG. 11.

Figure 12:
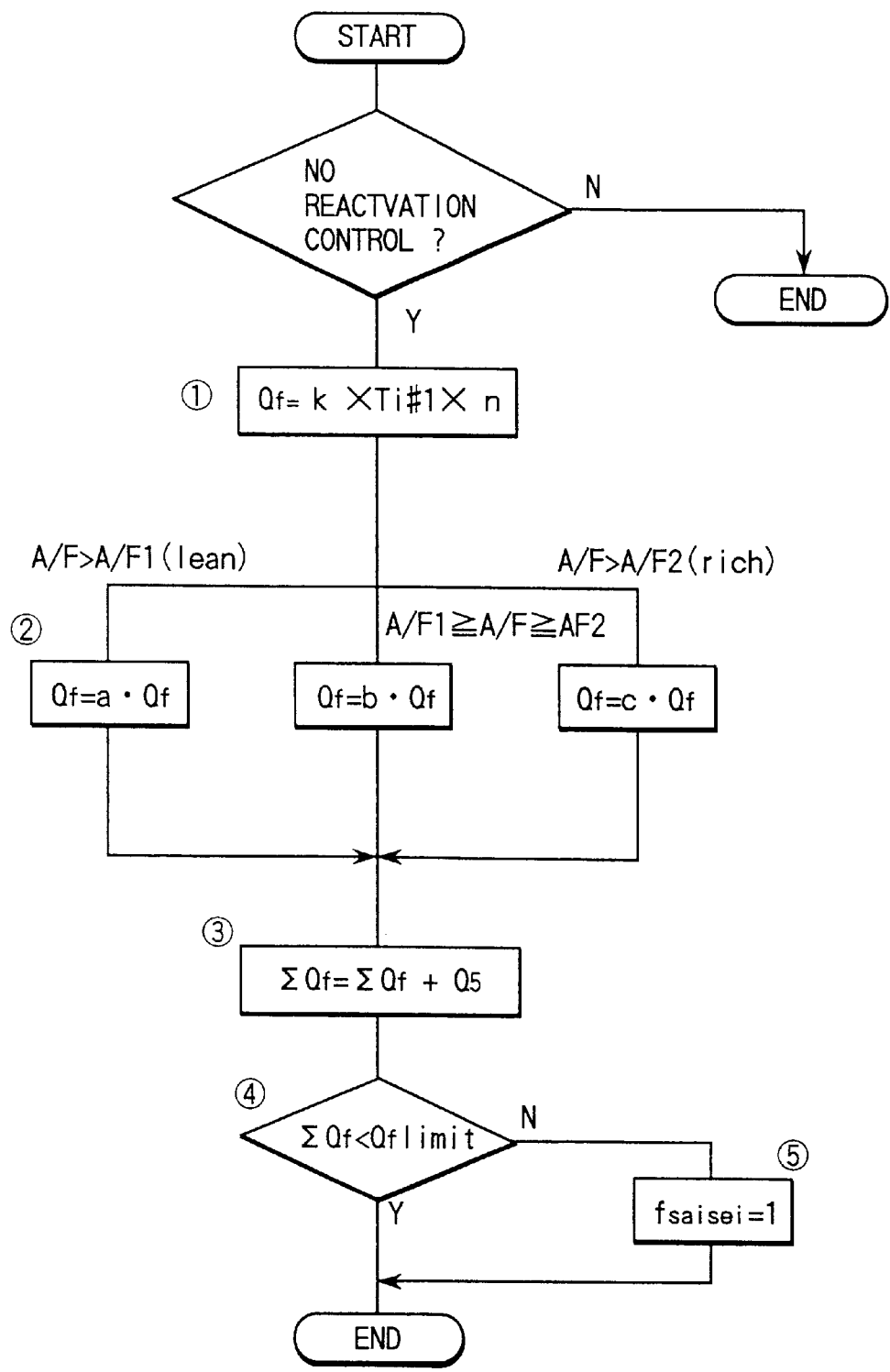
FIG. 12 is a flow chart for estimating a condition of the lean NOx catalyst.

FIG. 12 is a flow chart indicating a part of condition estimation of the lean NOx catalyst in an embodiment of the present invention, and the flow is executed actually as a program in the control unit.

As explained previously on FIG. 3, some conditions of the lean NOx catalyst 20 vary depending on the environment exposed to the exhaust gas. Factors reflecting the effects are such as a total amount of fuel supplied to the engine ($\Sigma Q_f$) a total number of fuel injection pulses ($\Sigma T_p$), a total amount of intake air ($\Sigma Q_a$), travel distance and travel time, and others. Particularly, because the condition of the catalyst depends on the amount of fuel burnt in the engine, an example of judging the condition of the catalyst based on the total amount of fuel supplied to the engine is taken as an embodiment of the present invention.

In accordance with the step ①, the amount of fuel per one cycle of the engine is calculated by multiplying a pulse breadth, which is represented by the pulse breadth of the first cylinder Ti#1, by a constant number K, which is a conversion factor to convert a pulse breadth to the amount of fuel, and further multiplying by the number of the cylinders n.

Figure 4:
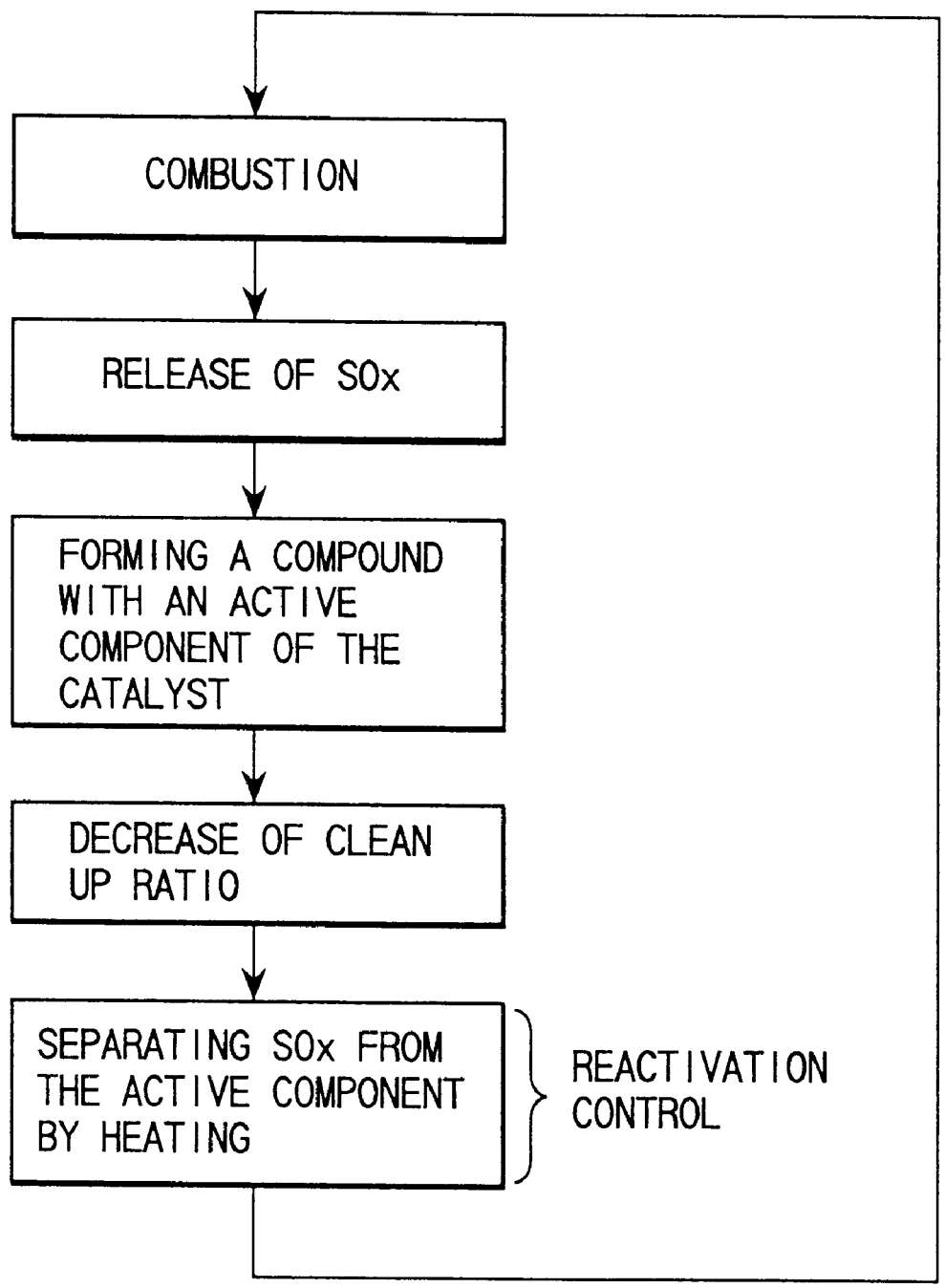
FIG. 4 is a flow chart for explaining the reaction of the lean NOx catalyst.

Then, in accordance with the step ②, weighting of the amount of fuel is performed based on the combustion condition at the moment. The weighting is performed based on a level of the air-to-fuel ratio in the operating condition. In FIG. 15, the air-to-fuel ratio is indicated in the abscissa, and a relationship between the air-to-fuel ratio and the exhaust gas temperature is indicated. That is, if the environment where the lean NOx catalyst is exposed to is only a lean condition, only the active components and the SOx form a compound as indicated in FIG. 4. However, if the operation is performed in a rich condition of the air-to-fuel ratio, the exhaust gas temperature is elevated, and separation of SOx is performed concurrently with the formation of the compound. Therefore, even if the fuel is supplied constantly, the degree of the compound formation varies depending on the air-to-fuel ratio at the time. The weighting in the step ② is performed in order to correct the variance in the degree of the compound formation.

In accordance with the step ③, the amount of fuel of only this time is added to the total amount of fuel hitherto. Then, a judgment whether the total amount of fuel reaches a limit value or not is performed in the step ④. If the limit is exceeded, the reactivation is necessary, and a flag $F_{saisei}$ for requesting the reactivation control is made $F_{saisei}=1$. The above is the part on the estimation of the catalyst condition.

An complementary explanation on the figure ① is performed hereinafter referring to FIG. 13. The fuel injection is performed in accordance with $R_{ef}$ signals for each of the cylinders. However, if summation of the total number of the pulses and judging the limit are performed every time, the load to the control unit is increased. Therefore, in accordance with the present invention, the processing using the pulse breadth of the representative cylinder is performed as indicated in FIG. 12. However, this part can be replaced with a method using the pulse breadth of each of the cylinders indicated in FIG. 14.

Figures 16, 17:
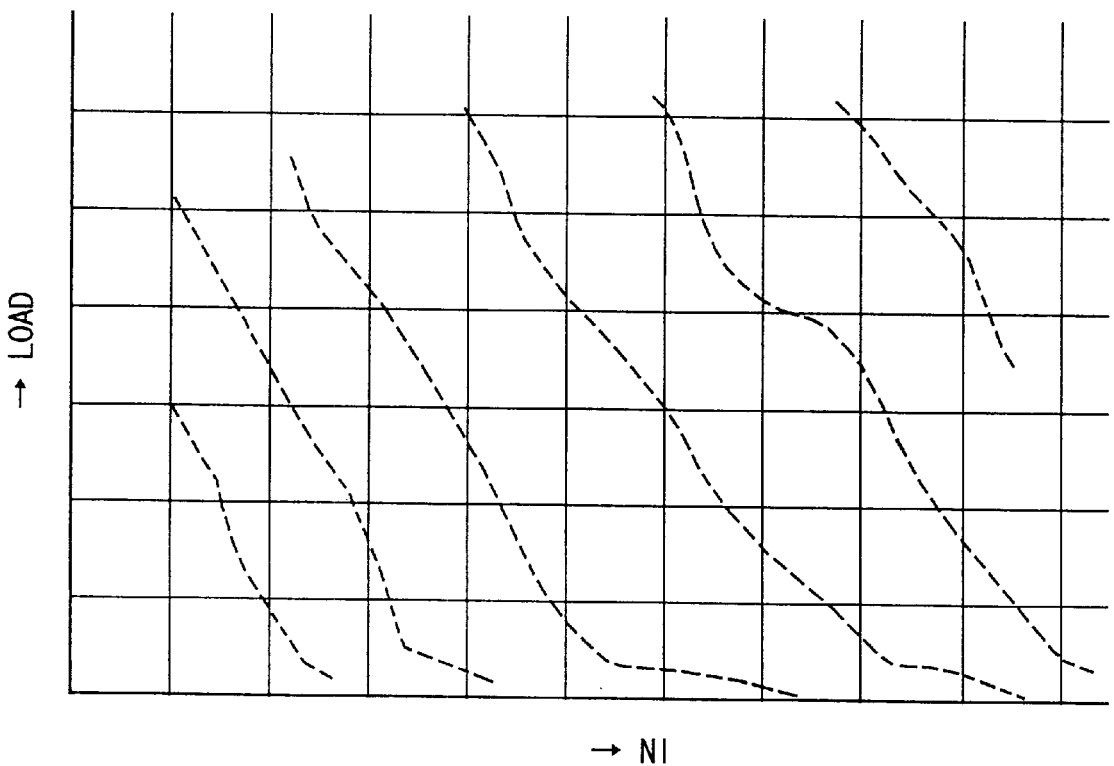
FIG. 16 is an illustration indicating a map composition of weighting factors.
FIG. 17 is another embodiment of the step ① shown in FIG. 12.

The weighting in the step ② is performed using the air-to-fuel ratio. However, if more exact control is required, a method indicated in FIG. 17 can be applied. That is, a method wherein the weighting factors are applied based on the number of rotations of the engine and the load to the engine as indicated in FIG. 16. The air-to-fuel ratio is set by the same map as FIG. 16, and the factor including the air-to-fuel ratio can be set.

Figure 18:
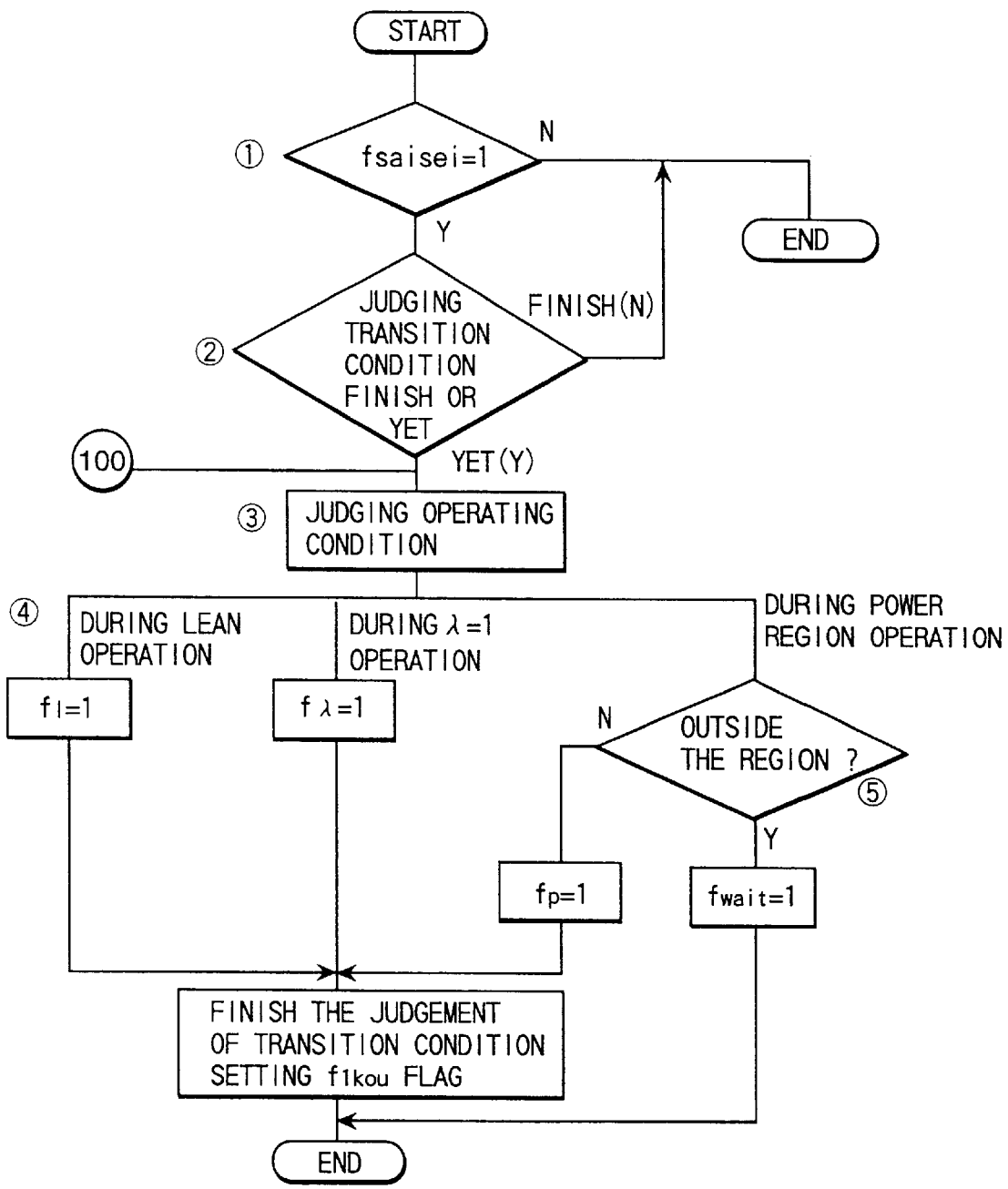
FIG. 18 is a flow chart for transition to reactivation control.
Figure 19:
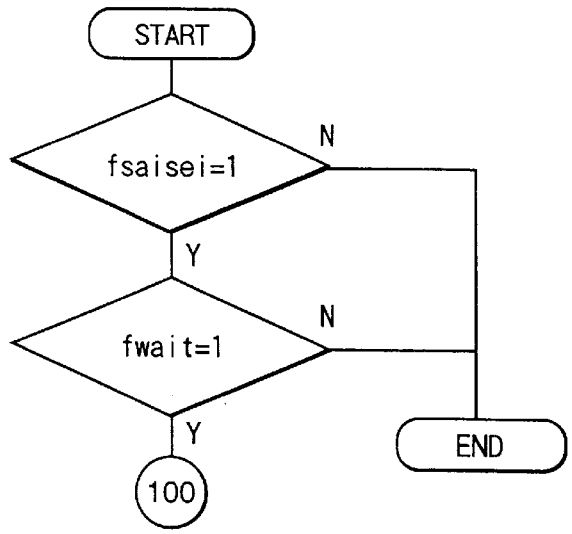
FIG. 19 is a flow chart for judging exemption region.

Then, FIG. 18 is explained.

The reactivation control is performed based on the condition of the condition judgment $F_{saisei}$ in FIG. 12.

Figure 20:
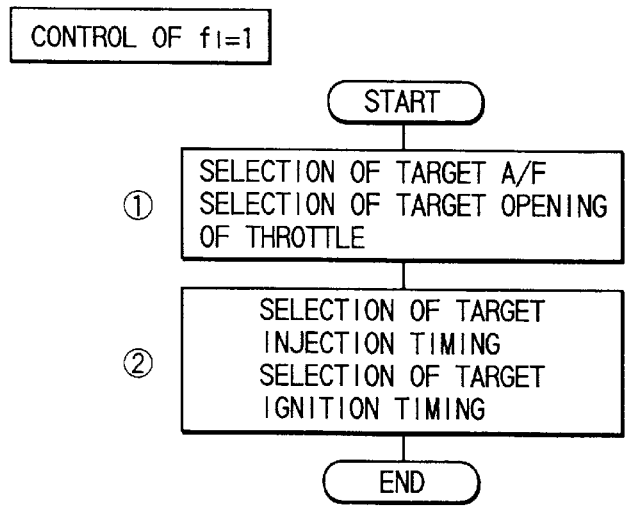
FIG. 20 is a flowchart for switching from stratification.
Figure 21:
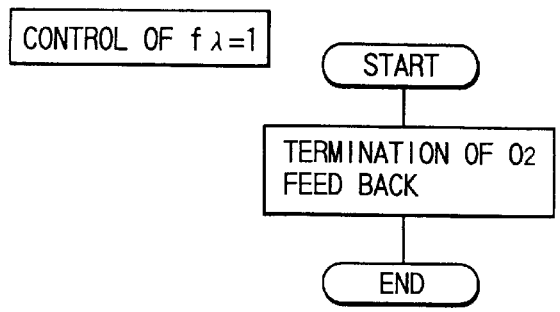
FIG. 21 is a flow chart for switching from stoichiometric air-to-fuel ratio combustion.

The reactivation control requirement is judged in the step ①. Completion of judgment on transfer control is judged in the step ②. The transfer control means an judgment whether the control between the point A to the point B is necessary or not, and is indicated in FIG. 20 and FIG. 21.

In the step ③, a judgment whether the engine is in stratified combustion, stoichiometric air-to-fuel combustion, or an operation in a power region at the moment when the reactivation requirement is generated is performed, and a flag setting for appropriate to each of regions is performed in the step ④. This is because the exhaust stroke injection and the ignition timing retardation are performed as the reactivation control, wherein:

(1) If the engine is during the stratified combustion in a lean condition, target air-to-fuel ratio, throttle opening, fuel injection timing, and ignition timing are controlled to transfer the engine once to a stoichiometric air-to-fuel ratio condition, and then, transfer the engine to the reactivation control.

This reason is that the effects of the reactivation control vary depending on the temperature of the catalyst atmosphere, and the exhaust gas temperature in the base condition is elevated by making the combustion condition to the stoichiometric air-to-fuel ratio condition.

(2) If the engine is operated in the stoichiometric air-to-fuel condition, it is well known technology and details are not explained here. However, an air-to-fuel feed back is interrupted in order to prevent the feed back system from operating to feed back the exhaust stroke injection, because if the exhaust stroke injection is performed in a condition that the air-to-fuel feed back system is operable, the feed back system operates to feed back the injection.

(3) In judging the power region, a high number of rotations and high load condition is particularly detected. Because, the exhaust gas temperature in the high number of rotations and high load condition is already in a fairly high condition, and, if the exhaust stroke injection is performed in the above condition, the temperature will exceed the withstand temperature of the catalyst itself. Therefore, the judgment whether in the exemption region or not is performed in the step ⑤. If the engine is in the exemption region from the high number of rotations and high load condition, the flag is set as a $F_{wait}$ condition, and monitoring of the operation condition is continued. When the operation condition exceeds the exemption region, the reactivation control is performed.

FIG. 20 indicates a process in a case when the step ④ in FIG. 18 determines the stratified combustion. As previously described, a target throttle opening is set based on the set of a target A/F ①, then, the engine is transferred to the stoichiometric air-to-fuel ratio condition by setting a target injecting timing and ignition timing in the step ②. The target values here are controls from the point A to the point B, and each of parameters is not renewed at once, but stepwise. All the control are set so as to add dampers, in order not to generate a torque change, and transferred to the stoichiometric air-to-fuel ratio condition. This is because, any shock accompanied with the change in condition is prevented, and any anxiety is not given to the operator accidentally.

FIG. 21 indicates a case when the judgment ④ in FIG. 18 determines a stoichiometric air-to-fuel ratio condition, and the air-to-fuel ratio feed back is interrupted in this case as described previously.

Hereinafter, details of the reactivation control is explained referring to FIG. 22~FIG. 25.

Figure 22:
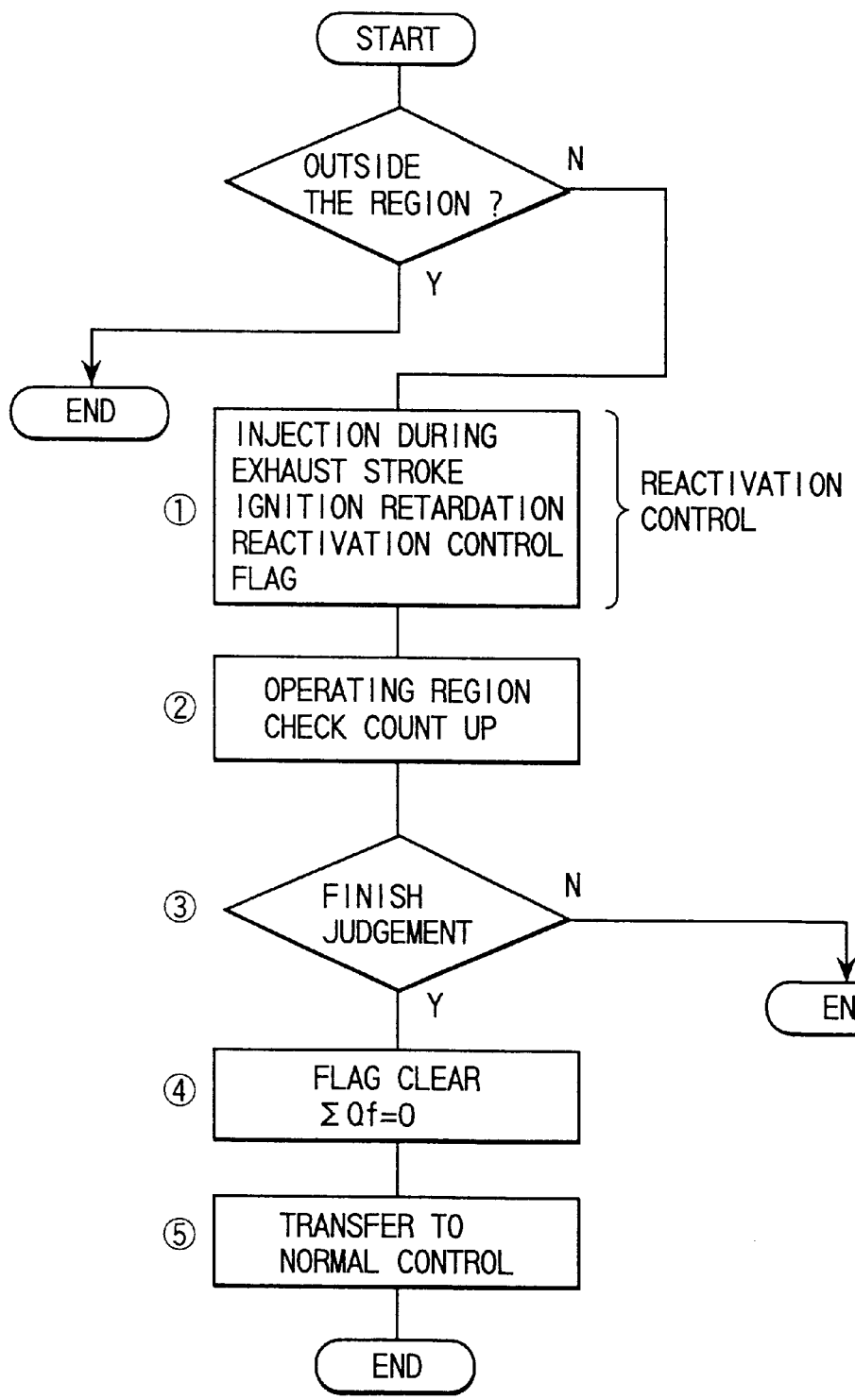
FIG. 22 is a flow chart for reactivation control.

The reactivation control is performed by setting the exhaust stroke fuel injection and the ignition timing retardation for the reactivation control in the step ① in FIG. 22.

Figure 23:
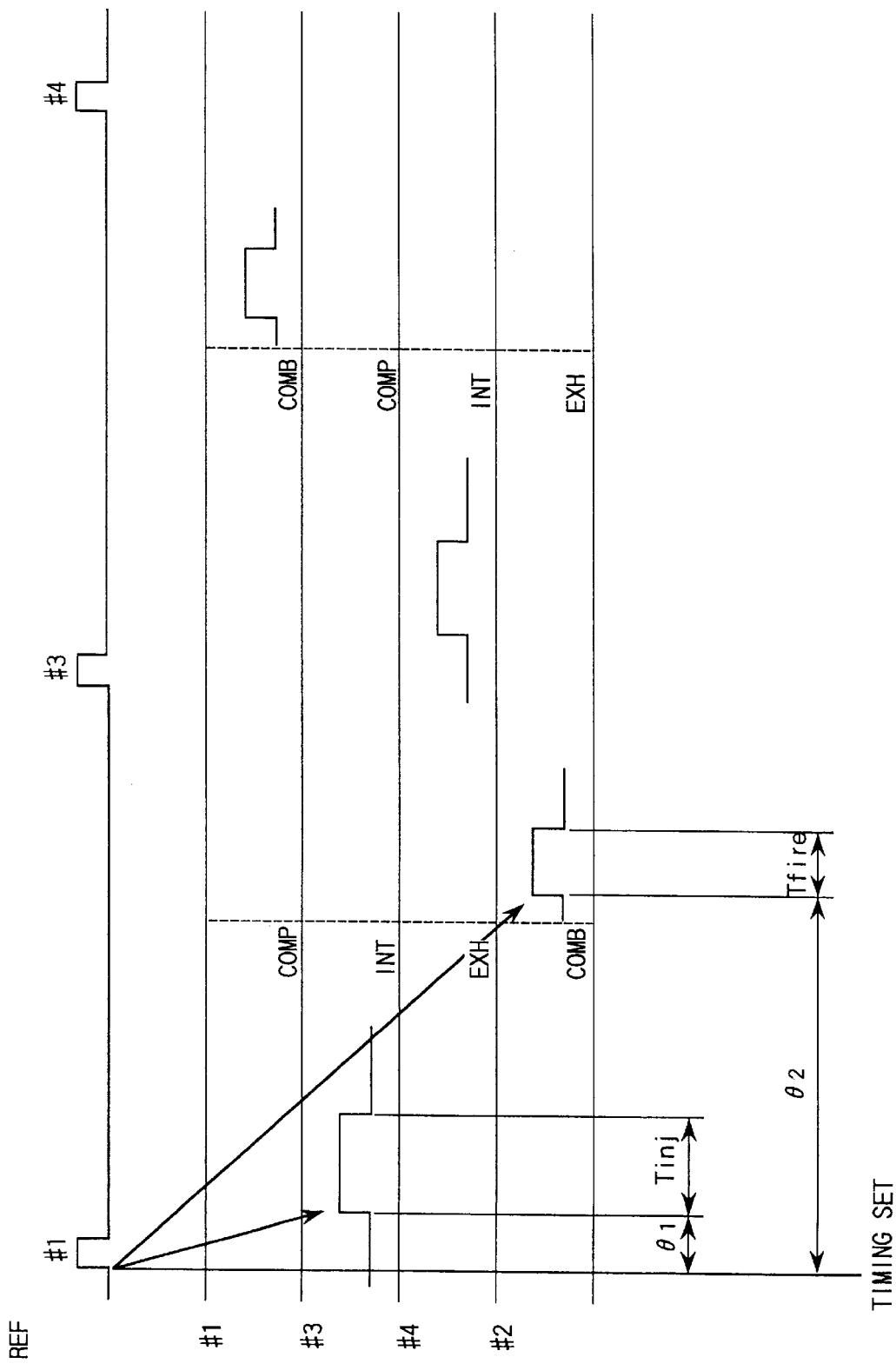
FIG. 23 is an illustration indicating exhaust stroke injection timing and set condition.

In particular, the exhaust stroke fuel injection is explained in detail referring to FIG. 23. Normally, in order to inject the fuel at an intake stroke synchronizing with a $R_{ef}$ signal, the pulse breadth $T_{inj}$ and θ1 from the $R_{ef}$ rise of #1 to the start of the injection is set (in FIG. 23, set to #3 cylinder). In accordance with the composition of the present invention, the exhaust stroke injection of #2, θ2, and the pulse breadth of the exhaust stroke injection, $T_{fire}$, are set simultaneously with setting the #3 at the $R_{ef}$ rise of #1.

Figure 24:
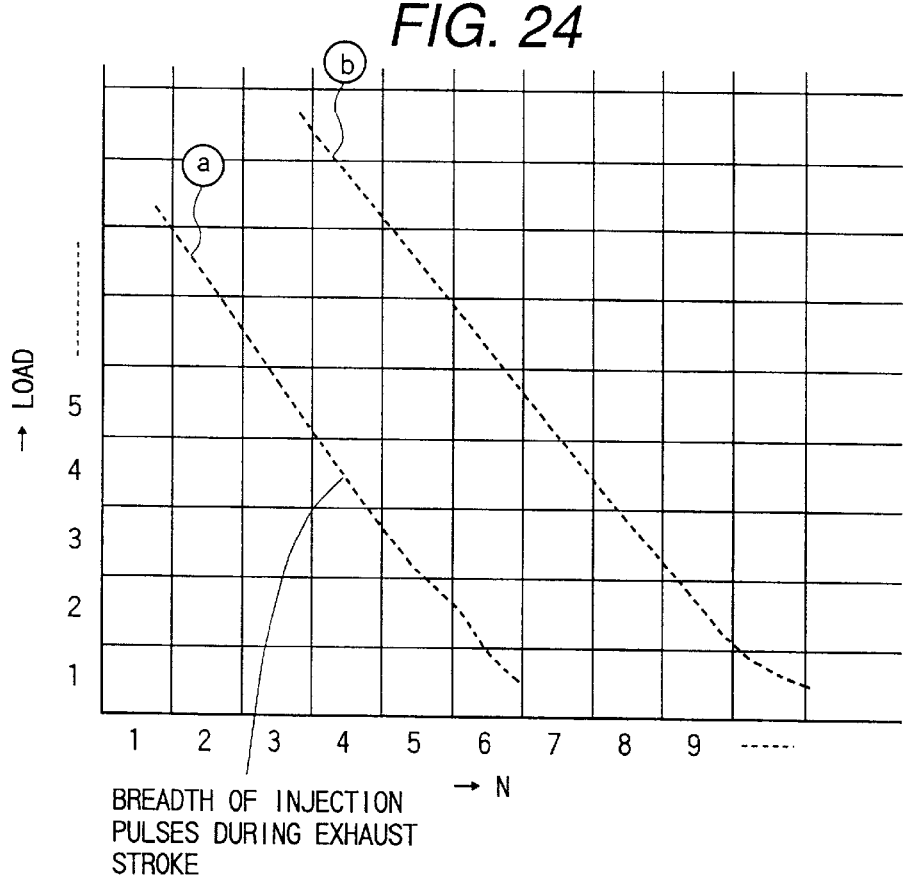
FIG. 24 is a map indicating breadth of exhaust stroke injection pulse.

The pulse breadth of the exhaust stroke injection is defined by the map indicating number of rotations of the engine and engine load as shown in FIG. 24. The philosophy of setting the pulse breadth in the exhaust stroke is to set a same pulse breadth in the regions indicated by (a) in FIG. 24. This is the characteristics of same air flow rate, the regions have a same exhaust gas temperature in a base condition (in stoichiometric air-to-fuel ratio combustion condition), and the exhaust gas temperature rise due to after burning by the fuel injection during a same exhaust stroke becomes almost same. For instance, (b) are regions having a higher exhaust gas temperature than (a). Regarding the ignition timing, the amount of retardation is set similarly using a map having the same composition.

Next, a check on the operation region indicated by ② in FIG. 22 is explained hereinafter. After starting the reactivation control, it is necessary to judge how long should the control be continued.

Figure 3:
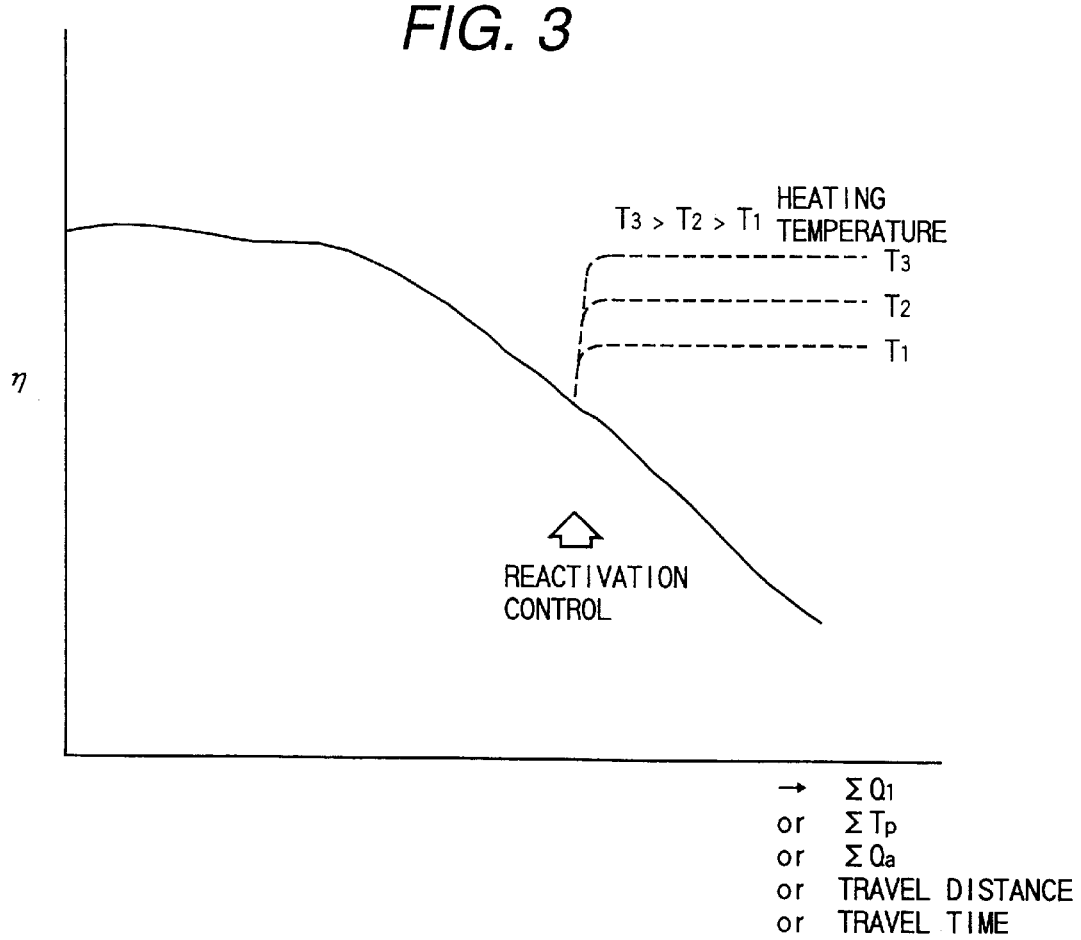
FIG. 3 is a graph for explaining the characteristics of the lean NOx catalyst.
Figure 25:
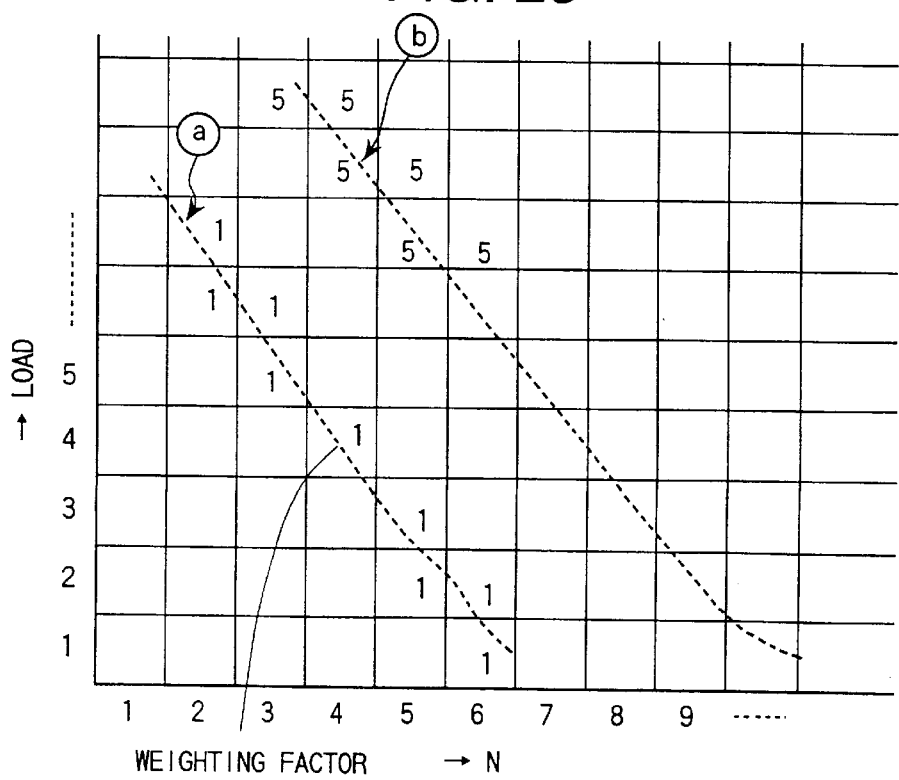
FIG. 25 is a map indicating weighting factors for judging end of reactivation control.

Because, the reactivation of the lean NOx catalyst indicated in FIG. 3 depends on the exhaust gas temperature and the control time as indicated in FIG. 10. In accordance with the present invention, the weighting factor of the region is assigned to the same composition map as FIG. 24 as indicated in FIG. 25. That is, the end of the reactivation is determined by a composition, wherein the number in each region is counted when the reactivation control is performed in the each region, and when the counted number exceeds a designated value, the reactivation control is judged as completed (step ③).

For instance, when the region judgment is performed per every cycle, the counted number becomes [1] when one cycle is passed at a point on the line (a), for instance, in FIG. 25, and, if the next one cycle is in the (b) region, [5] is added and the counted number becomes [6].

Thus, even if the reactivation is performed in any region, same effects (reactivation time, clean up rate after the reactivation) are intended.

The above is the explanation of an embodiment of the present invention.

As being understood from the above explanation, the engine control device provided with the lean NOx catalyst of the present invention has the following feature:

(1) The performance of the lean NOx catalyst can be ensured stably and certainly, and harmful exhaust gas can be suppressed certainly.

(2) The suppression of the exhaust gas can be achieved with adding no special devices and the like, and with a low cost.

(3) In accordance with applying the present invention, the reactivation control can be performed certainly in the range, which does not exceed the heat resistance of the catalyst.

What is claimed is:

1. An engine control device comprising
   a means for determining the amount of air taken into a cylinder of the engine;
   a means for calculating the amount of fuel injected so as to achieve a target air-to-fuel ratio;
   a means for calculating the amount of time that power must be supplied to an injector, so as to inject said amount of fuel;
   an injector for supplying fuel to said engine during the time power must be supplied obtained by said means for calculating the time power must be supplied;
   a means for igniting a combustible mixture by generating sparks with an ignition plug at a designated ignition time; and
   a lean NOx catalyst for cleaning exhaust gas released from said engine, which further comprises
   a means for determining or estimating the deteriorating condition of said lean NOx catalyst, and
   a means for reactivating a clean up rate by reactivating the clean up rate of said lean NOx catalyst based on a result obtained by said means for determining or estimating the deteriorating condition of said lean NOx catalyst.

2. An engine control device as claimed in claim 1, wherein said injector is an in-cylinder-injector for injecting fuel directly into a combustion chamber of said engine.

3. An engine control device as claimed in claim 2, wherein said reactivation control is performed by retarding the ignition time.

4. An engine control device as claimed in claim 2, wherein said clean up rate reactivation means comprises
   a means for generating an after-burn effect by injecting fuel during an exhaust stroke.

5. An engine control device as claimed in claim 2, wherein the control time for each reactivation of said clean up rate per once is set so that all subsequent control time is longer than the first control time.

6. An engine control device as claimed in claim 2, wherein the control time of said clean up rate reactivation is set variably depending on the temperature of the exhaust gas during the reactivation.

7. An engine control device as claimed in claim 2, wherein estimation of said deteriorating condition is performed using, at least, any one of the total amount of fuel supplied to the engine, the total breadth of fuel injection pulses, the total amount of air taken in, and the total amount of travel distance or travel time.

8. An engine control device as claimed in claim 2, wherein the engine is operated in a stoichiometric air-to-fuel condition during the reactivation of said clean up rate.

9. An engine control device as claimed in claim 2, wherein performance of said clean up rate reactivation is restricted based on, at least, any one of the exhaust gas temperature, the number of rotations of the engine, and the load to the engine.

10. An engine control device as claimed in claim 2, wherein
said clean up rate reactivation is performed so that, when the engine combustion condition is in a lean combustion condition, said engine combustion condition is transferred once to said reactivation means via a stoichiometric air-to-fuel ratio combustion condition.

11. An engine control device as claimed in claim 1, wherein
said reactivation control is performed by retarding the ignition time.

12. An engine control device as claimed in claim 1, wherein
said clean up rate reactivation means comprises
a means for generating an after-burn effect by injecting fuel during an exhaust stroke.

13. An engine control device as claimed in claim 1, wherein
the control time for each reactivation of said clean up rate per once is set so that all subsequent control time is longer than the first control time.

14. An engine control device as claimed in claim 1, wherein
the control time of said clean up rate reactivation is set variably depending on the temperature of the exhaust gas during the reactivation.

15. An engine control device as claimed in claim 1, wherein
estimation of said deteriorating condition is performed using, at least, any one of the total amount of fuel supplied to the engine, the total breadth of fuel injection pulses, the total amount of air taken in, and the total amount of travel distance or travel time.

16. An engine control device as claimed in claim 1, wherein
the engine is operated in a stoichiometric air-to-fuel condition during the reactivation of said clean up rate.

17. An engine control device as claimed in claim 1, wherein
performance of said clean up rate reactivation is restricted based on, at least, any one of the exhaust gas temperature, the number of rotations of the engine, and the load to the engine.

18. An engine control device as claimed in claim 1, wherein
said clean up rate reactivation is performed so that, when the engine combustion condition is in a lean combustion condition, said engine combustion condition is transferred once to said reactivation means via a stoichiometric air-to-fuel ratio combustion condition.

19. An engine control device as claimed in claim 18, wherein
switching said lean combustion condition to said stoichiometric air-to-fuel ratio combustion condition is performed such that the same engine torque as that in said lean combustion condition is maintained.

20. An engine control device as claimed in claim 19, wherein
a means for maintaining the engine torque includes any one of throttle opening, fuel injection timing, and ignition timing.

21. An engine control device comprising
a means for determining the amount of air taken into a cylinder of the engine;
a means for calculating the amount of fuel injected so as to achieve a target air-to-fuel ratio;
a means for calculating the amount of time that power must be supplied to an injector, so as to inject said amount of fuel;
an injector for supplying fuel to said engine during the time power must be supplied obtained by said means for calculating the time power must be supplied;
a means for igniting a combustible mixture by generating sparks with an ignition plug at a designated ignition time; and
a lean NOx catalyst for cleaning exhaust gas released from said engine, which further comprises
means for reactivating a clean up rate in order to reactivate the clean up rate of said lean NOx catalyst, wherein said clean up reactivation is performed by controlling either the temperature of said lean NOx catalyst or of that of the exhaust gas at the upstream entrance of said lean NOx catalyst within a range of 500° C. to 900° C.

22. An engine control device as claimed in claim 21, wherein
said reactivation control is performed by retarding the ignition time.

23. An engine control device as claimed in claim 21, wherein
said clean up rate reactivation means comprises
a means for generating an after-burn effect by injecting fuel during an exhaust stroke.

24. An engine control device as claimed in claim 21, wherein
the control time for each reactivation of said clean up rate per once is set so that all subsequent control time is longer than the first control time.

25. An engine control device as claimed in claim 21, wherein
the control time of said clean up rate reactivation is set variably depending on the temperature of the exhaust gas during the reactivation.

26. An engine control device as claimed in claim 21, wherein
the engine is operated in a stoichiometric air-to-fuel condition during the reactivation of said clean up rate.

27. An engine control device as claimed in claim 21, wherein
performance of said clean up rate reactivation is restricted based on, at least, any one of the exhaust gas temperature, the number of rotations of the engine, and the load to the engine.

28. An engine control device as claimed in claim 21, wherein
said clean up rate reactivation is performed so that, when the engine combustion condition is in a lean combustion condition, said engine combustion condition is transferred once to said reactivation means via a stoichiometric air-to-fuel ratio combustion condition.

29. An engine control device comprising
a means for determining the amount of air taken into a cylinder of the engine;
a means for calculating the amount of fuel injected so as to achieve a target air-to-fuel ratio;
a means for calculating the amount of time that power must be supplied to an injector, so as to inject said amount of fuel,
an injector for supplying fuel to said engine during the time power must be supplied obtained by said means for calculating the time power must be supplied;

a means for igniting a combustible mixture by generating sparks with an ignition plug at a designated ignition time; and a lean NOx catalyst for cleaning exhaust gas released from said engine, which further comprises a means for reactivating a clean up rate in order to reactivate the clean up rate of said lean NOx catalyst, wherein said clean up reactivation is performed by making the continuous unit time of said reactivation less than 30 seconds, when said temperature of said lean NOx catalyst or of the exhaust gas at the upstream entrance of said lean NOx catalyst exceeds 900° C. during said reactivation.

30. An engine control device as claimed in claim 29, wherein said reactivation control is performed by retarding the ignition time.

31. An engine control device as claimed in claim 29, wherein said clean up rate reactivation means comprises a means for generating an after-burn effect by injecting fuel during an exhaust stroke.

32. An engine control device as claimed in claim 29, wherein the engine is operated in a stoichiometric air-to-fuel condition during the reactivation of said clean up rate.

33. An engine control device as claimed in claim 29, wherein performance of said clean up rate reactivation is restricted based on, at least, any one of the exhaust gas temperature, the number of rotations of the engine, and the load to the engine.

34. An engine control device as claimed in claim 29, wherein said clean up rate reactivation is performed so that, when the engine combustion condition is in a lean combustion condition, said engine combustion condition is transferred once to said reactivation means via a stoichiometric air-to-fuel ratio combustion condition.

35. An engine control method, comprising the steps of determining an amount of air taken into an engine cylinder;

calculating an amount of injected fuel so as to achieve a target air-to-fuel ratio;

calculating an amount of time that power must be supplied to inject said amount of fuel;

supplying fuel to said engine during the time that power must be supplied in accordance with the calculated time that power must be supplied;

igniting a combustible mixture at a designated ignition time;

determining or estimating a deteriorating condition of a lean catalyst, and reactivating a clean up rate of said lean catalyst based on a result obtained by determining or estimating the deteriorating condition.

36. An engine control method comprising the steps of determining an amount of air taken into an engine cylinder, calculating an amount of injected fuel to achieve a target air-to-fuel ratio;

calculating an amount of time that power must be supplied to inject said amount of fuel;

supplying fuel during the calculated time that power must be supplied;

igniting a combustible mixture at a designated ignition time; and reactivating a clean up rate of a lean NOx catalyst by controlling either the temperature of said lean NOx catalyst or of the exhaust gas at an upstream entrance of said lean NOx catalyst within a range of 500° C. to 900° C.

37. An engine control method comprising the steps of determining an amount of air taken into an engine cylinder;

calculating an amount of injected fuel to achieve a target air-to-fuel ratio;

calculating an amount of time that power must be supplied to inject said amount of fuel;

supplying fuel during the calculated time that power must be supplied;

igniting a combustible mixture at a designated ignition time; and reactivating a clean up rate of a NOx catalyst by making a continuous unit time of said reactivation less than 30 seconds, when said temperature of said lean NOx catalyst or of the exhaust gas at an upstream entrance of said lean NOx catalyst exceeds 900° C. during said reactivation.

* * * * *